(12) United States Patent
Chin et al.

(10) Patent No.: US 7,676,215 B2
(45) Date of Patent: Mar. 9, 2010

(54) EMERGENCY CALL BACK METHOD

(75) Inventors: Mary Chin, Westmont, IL (US);
Douglas Rollender, Bridgewater, NJ (US)

(73) Assignee: Alcatel Lucent USA Inc., Murray Hill, NJ (US)

( * ) Notice: Subject to any disclaimer, the term of this patent is extended or adjusted under 35 U.S.C. 154(b) by 357 days.

(21) Appl. No.: 10/270,629

(22) Filed: Oct. 16, 2002

(65) Prior Publication Data
US 2004/0203565 A1 Oct. 14, 2004

(51) Int. Cl.
*H04M 11/00* (2006.01)

(52) U.S. Cl. ............ 455/404.1; 455/421; 379/45

(58) Field of Classification Search ........... 455/404.1, 455/404.2, 412.2, 414.1, 427, 403, 433, 453.1, 455/445; 379/45, 49, 37
See application file for complete search history.

(56) References Cited

U.S. PATENT DOCUMENTS

| | | | | |
|---|---|---|---|---|
| 5,444,760 A | * | 8/1995 | Russ | 379/45 |
| 5,579,368 A | * | 11/1996 | van Berkum | 379/9.06 |
| 5,646,987 A | * | 7/1997 | Gerber et al. | 379/266.02 |
| 5,689,548 A | * | 11/1997 | Maupin et al. | 455/404.1 |
| 5,712,900 A | * | 1/1998 | Maupin et al. | 455/433 |
| 6,038,437 A | * | 3/2000 | Zicker | 455/404.1 |
| 6,678,357 B2 | * | 1/2004 | Stumer et al. | 379/45 |
| 6,744,857 B2 | * | 6/2004 | Stumer | 379/45 |
| 2002/0136361 A1 | * | 9/2002 | Stumer et al. | 379/45 |
| 2003/0063714 A1 | * | 4/2003 | Stumer et al. | 379/37 |
| 2004/0032932 A1 | * | 2/2004 | Kucmerowski et al. | 379/45 |

FOREIGN PATENT DOCUMENTS

WO WO 00/11879 3/2000

OTHER PUBLICATIONS

"NENA Technical Information Document (TID) On PSAP Call Back to All 9-1-1 Callers, Combating Wireles E911 Fraud And Mobile Emergency Service (E911M)", prepared by National Emergency Number Association (NENA), Mobile Emergency Service (E911M) Joint Working Group of the Wireless Technical Committee and the Network Technical Committee, Published by NENA, Mar. 22, 2005, pp. 1-51.
Gomez, Ricardo. "Global Title Translation (GTT) Routing." IFAST Journal, vol. 2, No. 1, Mar. 2003, pp. 2-4.
EP Search Report, Feb. 24, 2004.

* cited by examiner

*Primary Examiner*—CongVan Tran
(74) *Attorney, Agent, or Firm*—Harness, Dickey & Pierce

(57) ABSTRACT

An emergency routing number is assigned to each switch in a wireless network. When a switch of the wireless network routes an emergency call to a Public Service Answering Point (PSAP), the switch sends the emergency routing number as the calling party number and provides the PSAP with the identifier of the mobile station. If the emergency call drops, the PSAP performs a call back using the emergency routing number as the called party number. The switch that routed the emergency call from the mobile station to the PSAP receives the call back. The PSAP also sends the identifier of the mobile station to the switch. When a switch receives its emergency routing number as the called party number, the switch recognizes an emergency call back situation and pages the mobile station identified by the mobile station identifier received in association with the emergency routing number. The mobile station is then reconnected with the PSAP.

9 Claims, 2 Drawing Sheets

```
                    Callback (1)
MS1 <---------------------------- MSC <---------------------------- PSAP
        Page=MSID1                                    CdPN=ELRN
                                                      GAP=MSID1
```

*Callback (1)*

*Callback (2)*

*Callback (1)*

*Callback (2)*

EMERGENCY CALL BACK METHOD

BACKGROUND OF THE INVENTION

Emergency service calls in North America are originated by dialing "9-1-1." Other parts of the world may use some other abbreviated string of dialable digits such as "6-1-1" in Mexico; all share the intent to provide the caller with an easy way to call for help with an easy to remember number. These calls are routed to a local Public Service Answering Point (PSAP) where an emergency response may be initiated (police, fire department, road repair, ambulance, etc.) while the caller is kept on the phone. If the call is somehow disconnected or dropped before the emergency is completely reported or the responder arrives, the PSAP may call back the originator using a call back number provided through its databases.

For example, the call record for a 911 call originated through a wired network may include Automatic Line Identification (ANI) or the telephone number of the access line from which the call originated. However, the mobile directory number (MDN) or telephone number of a wireless subscriber is not associated with a physical line or mobile station. Instead, calls to a wireless subscriber are routed to the mobile station by way of the mobile station identification (MSID), not the MDN. Accordingly, performing an emergency call back to a mobile station poses hurdles not encountered with, e.g., land line devices.

Typically, the MSID is either a 10-digit mobile identification number (MIN) or a 15-digit International Mobile Subscriber Identifier (IMSI) programmed into a mobile station by the service provider with whom the mobile station user has entered into a service agreement. Accordingly, the MSID is not necessarily a dialable number.

The MDN of a mobile station is a dialable number. The MDN is dialed by a caller and used to route a call through the network to the wireless subscriber's home system. At the subscriber's home system, the home location register (HLR) contains the MSID associated with the subscriber's MDN. The MSID, not the MDN, is then used to route the call through the network to the serving wireless system and page the subscriber. The subscriber's MDN is provided by the home system to the serving system in a separate data file called the subscriber profile.

The use of a separate number for MDN and MSID is new to some systems. Historically, in TIA/EIA-41 systems before the implementation of wireless number portability (WNP) or thousands block number pooling (TBNP) based on the Local Routing Number (LRN) method and international roaming (IR), the mobile identification number (MIN) of a mobile station was the same as the MDN. However, with WNP and TBNP, the MDN became "portable" or "poolable" from one service provider to another service provider. Since MSID is not portable or poolable, the recipient service provider assigns a new MSID for a subscriber with a ported-in or pooled MDN.

International roaming also forced the separation of MSID and MDN. While the MIN is a 10-digit number modeled after the North American Numbering Plan's 10-digit MDN, other nation's carriers using a different directory numbering plan may not allow their MDN to be equivalent to the internationally recognized MIN format. Another standard MSID is the IMSI. It is used in both TIA/EIA-41 and GSM systems around the world. IMSI is a 15-digit number, and therefore, can not serve as a 10-digit MDN.

Historically, when the MDN was the same as the MIN, the MIN would be delivered to a PSAP and would be used for a call back number. With the separation of MIN and MDN as described above, it became necessary to deliver the MDN as a separate call back number to the PSAP as well as the caller's MSID. There are certain problems associated with implementing this solution. The primary problem is that the serving system may not have the caller's MDN, only the MSID, to present to the PSAP with the call. Some of the reasons for this relate to the way MSID-MDN separation has been implemented according to standards.

An old serving TIA/EIA-41 system may not support WNP, TBNP or IR. This means that the older serving system may be expecting the MIN and the MDN to be the same. The older system would not even know to look for a separate MDN in the subscriber's service profile (keyed on MIN, not MDN). With this limitation, these subscribers may not be allowed to use basic services, but they must be allowed to call for emergency services. As a result, a roamer who dials "9-1-1" while on an old system will have his or her call delivered to the PSAP with an MSID but no MDN. Accordingly, no call back is possible.

A newer serving system that is WNP and IR capable may not be able to deliver MDN to the PSAP. This could happen if the calling mobile station is not registered with any service provider (e.g., there are mobile phones used for emergency calls only). It is also possible for a subscriber to place an emergency call before the HLR has responded to the serving system with the subscriber's service profile containing the MDN.

The call back MDN for an international roamer would require the PSAP to place an international call to reach a subscriber in their local Emergency Service Zone (ESZ). This is not a practical, timely or sufficiently reliable solution for a PSAP that normally does not place international calls and may require immediate call back information in order to save someone's life. In addition, the entire international MDN (up to 15 digits including a country code) may not be presented to the PSAP for callback.

One proposed solution to these problems calls for delivering 9-1-1+the last 7 digits of the electronic serial number (ESN) of the calling mobile station to the PSAP as the call back number when the MDN is not available. While this may serve to identify the caller to the PSAP and the serving system, this "9-1-1+ESN7" can not be routed through the network and can not be used to place a call back.

SUMMARY OF THE INVENTION

The call back method according to the present invention assigns an emergency local routing number (ELRN) to each switch in a wireless network. When a switch of the wireless network routes an emergency call to a Public Service Answering Point (PSAP), the switch sends the emergency local routing number as the calling party number (CgPN) and provides the PSAP with the identifier of the mobile station (MSID). If the emergency call drops, the PSAP performs a call back using the emergency routing number as the called party number (CdPN). As a result the switch that routed the emergency call from the mobile station to the PSAP receives the call back. The PSAP also sends the identifier of the mobile station to the switch. This MSID is used to page the correct mobile station. In an embodiment of the present invention, the PSAP signals the mobile station identifier to the switch in a generic address parameter.

When a switch receives its emergency local routing number as the called party number, the switches recognizes an emergency call back situation and pages the mobile station identified by the mobile station identifier received in association with the emergency routing number. In an embodiment of the present invention, the switch gives higher priority to handling the call back than other tasks when an ELRN is the CdPN. In this manner, the PSAP is reconnected with the mobile station.

BRIEF DESCRIPTION OF THE DRAWINGS

The present invention will become more fully understood from the detailed description given herein below and the accompanying drawings which are given by way of illustration only, wherein like reference numerals designate corresponding parts in the various drawings, and wherein.

DETAILED DESCRIPTION OF EMBODIMENTS

The call back method according to the present invention assigns a unique routable call back number to each switch (e.g., a mobile switching center (MSC)) in a wireless communication system. This number will be referred to as an "Emergency Local Routing Number" or ELRN hereafter. The ELRN can be thought of as similar to the local routing number (LRN) assigned to each local switch to implement wireless number portability (WNP) or thousands block number pooling (TBNP). However, an ELRN can only be routed to the switch that owns the number, and the ELRN for each switch is unique and is not portable.

As is known, when a mobile station makes an emergency call, the mobile station identifier (MSID) is supplied in association with the emergency call. For example, the MSID is the mobile identification number (MIN), a ten digit International Roaming Mobile Identification Number (IRM) for those 10 digit numbers outside the range of the North American Numbering Plan, or the International Mobile Subscriber Identifier (IMSI). When a switch of the wireless system receives an emergency call (e.g., a 9-1-1 call) from a mobile station, particularly, a mobile station with no MDN, the switch sends the ELRN of the switch to the Public Service Answering Point (PSAP) serving the switch. The switch supplies ELRN as the calling party number (CgPN), and also provides the PSAP with the MSID of the mobile station. For example, the MSID is signaled such as in the ISUP generic address parameter (GAP).

If the emergency call drops, the PSAP performs a call back using the ELRN as the called party number (CdPN). As a result, the switch that routed the emergency call from the mobile station to the PSAP receives the call back. The PSAP also sends the identifier of the mobile station to the switch. For example, the MSID is signaled with the call back such as in the ISUP generic address parameter (GAP).

When a switch receives its emergency routing number as the called party number, the switch recognizes an emergency call back situation and pages the mobile station identified by the MSID received in association with the ERLN and establishes the emergency call back. This ERLN technique may also be provisioned with priority queuing in the switches; wherein the switch handles the call back number at a higher priority than tasks involving other calls. This should improve the emergency call back completion rate even during peak traffic periods at the switch. Furthermore, while described as performed for all emergency calls, use of the method could be limited to just emergency calls made by mobile stations with no or unavailable MDNs.

Figure 1:
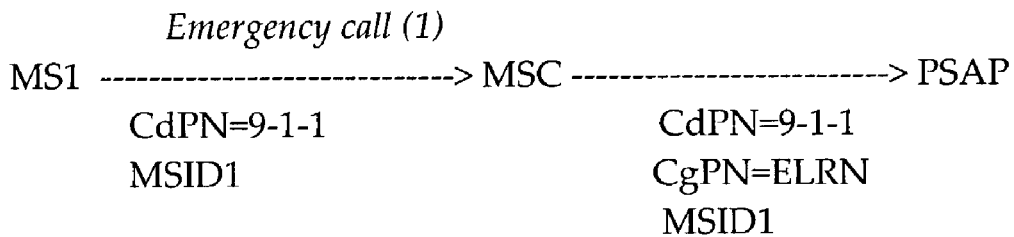
FIGS. 1-6 are communication flow diagrams illustrating the operation of the call back method according to the present invention.

FIGS. 1-6 are communication flow diagrams illustrating the operation of the call back method according to the present invention. As shown in FIG. 1, a first mobile station MS1 places an emergency call, a 9-1-1 call in this example, that is received by a MSC. Accordingly, the called party number is 9-1-1, and the MSID1 of the first mobile station MS1 is supplied to the MSC as well. The MSC then routes the emergency call to the serving PSAP. In so doing, the called party number remains 9-1-1, but the MSC supplies its ERLN as the calling party number. The MSC also supplies the MSID1 of the first mobile station MS1 in the generic address parameter (GAP).

Figure 2:
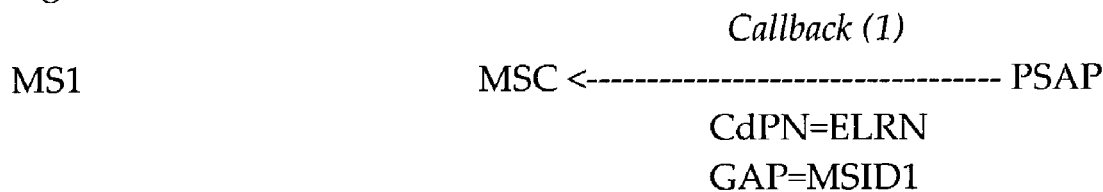
Figure 3:
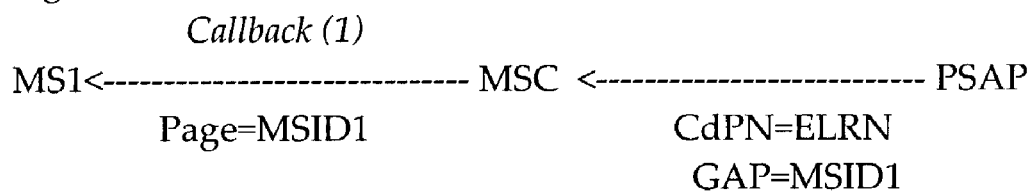

If the emergency call is dropped, the PSAP performs a call back using the ERLN as the called party number because the ERLN was supplied to the PSAP as the calling party number. The result is that the call back is routed to the MSC as shown in FIG. 2. As further shown in FIG. 2, the MSID1 of the first mobile station is signaled with the call back in the ISUP GAP. As shown in FIG. 3, the MSC uses the MSID1 of the first mobile station MS1 to page the first mobile station MS1 and complete the call back.

Figure 4:
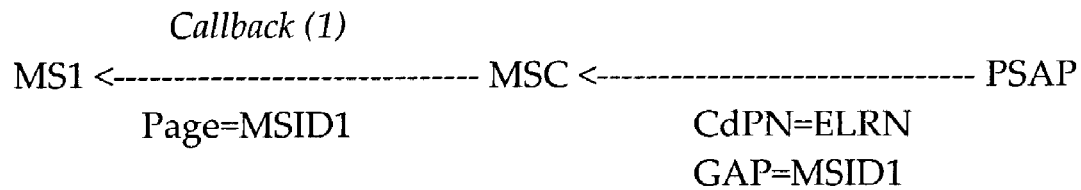
Figure 4:
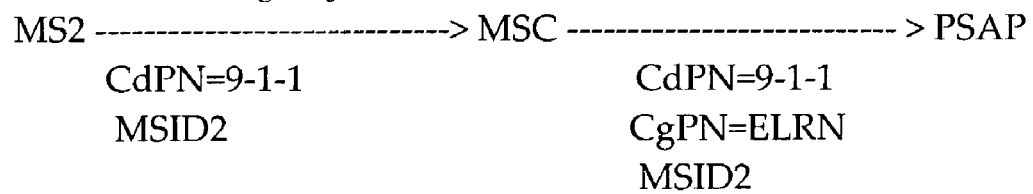

Assume that while the call back to the first mobile station MS1 is in progress, a second mobile station MS2 places a 9-1-1 emergency call as shown in FIG. 4. As with the emergency call from the first mobile station MS1, the second mobile station MS2 supplies its mobile station identifier MSID2 along with the emergency call (e.g., called party number is 9-1-1). Then, the MSC then routes the emergency call to the PSAP. In so doing, the called party number remains 9-1-1, but the MSC supplies its ERLN as the calling party number. The MSC also supplies the MSID2 of the second mobile station MS2 to the PSAP. Accordingly, FIG. 4 demonstrates that the MSC supplies the same calling party number (i.e., the ERLN) to the PSAP for both of the emergency calls.

Figure 5:
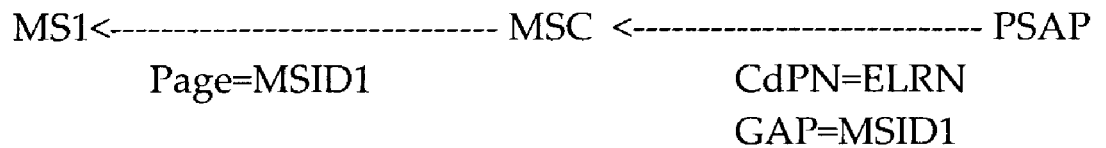
Figure 5:
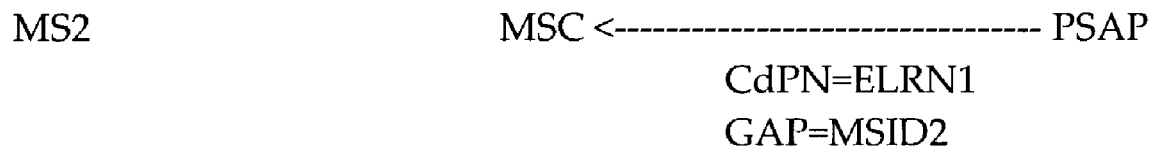
Figure 6:
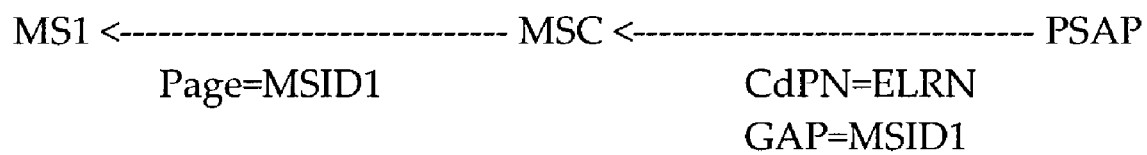
Figure 6:
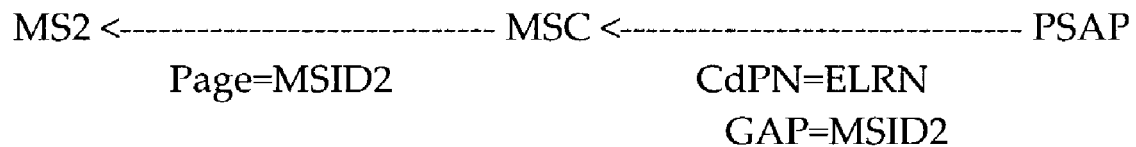

If the second emergency call is dropped, the PSAP performs a call back using the ERLN as the called party number because the ERLN was supplied to the PSAP as the calling party number. The result is that a second call back is routed to the MSC as shown in FIG. 5. As further shown in FIG. 5, the MSID2 of the second mobile station is signaled with the second call back in the ISUP GAP. As shown in FIG. 6, the MSC uses the MSID2 of the second mobile station MS2 to page the second mobile station MS2 and complete the call back.

The emergency call back method of the present invention ensures a routable call back number is provided to a PSAP with every emergency call from a mobile station. Specifically, the ELRN is one number used to route one or many emergency service call backs to the originating switch (e.g., MSC). The ELRN of the originating switch is signaled to the PSAP as the calling party number (CgPN), particularly when there is no local MDN available to accompany an emergency call.

In the North American Numbering Plan, the ELRN is a 10-digit number (NPA-NXX-XXXX) where the leading 6-digits (NPA-NXX) are uniquely assigned to each local switch in North America for call routing purposes. The subsequent four digits are assigned by the switch operator. However, the emergency call back method is applicable in a public switched network anywhere in the world. Namely, the ELRN contains those digits assigned from any national numbering plan to route calls to a particular switch. Also, the emergency call back method may be applied with any mobile service or wireless access technology.

The emergency call back method is independent of number portability and number pooling. These network capabilities depend upon the Local Routing Number (LRN) Method to route a call to a serving switch based on the LRN associated with a ported or pooled dialed number. In comparison, the ELRN is not associated with a dialed number, instead it is associated with a switch.

In some ways, the ELRN functions in the public network like the Local Routing Number (LRN) required for local number portability; for instance, both function as a single number to route many calls to a particular switch. However, no database query is required to identify the ELRN required to route a call to a serving MSC. As a result, when used as the called party number (CdPN) to route a callback from a PSAP to the serving MSC, the ELRN may be accompanied with the ISUP Forward Call Indicator (FCI) set to indicate no number portability database query is required.

As discussed above, an ELRN is not associated with any particular MDN and is used to route a call back directly to the serving switch, not the home system. The ELRN eliminates the need for the PSAP to use a MDN to place an emergency call back. There is no need to request an MDN or an LRN to route a callback through a home system as per existing mobile application part (MAP) standards. Also, there is no need to place an international call through a foreign home system to call back an international roamer in the local area. This reduces signaling, saves time and improves service reliability. Further, there is no need for a Temporary Long Distance Number (TLDN), as in TIA/EIA-41 networks, or a Mobile Station Routing Number (MSRN), as in GSM networks, to route a call back from the home system to the serving system. This reduces signaling, saves time and places no demand on the supply of TLDNs or MSRNs.

The invention being thus described, it will be obvious that the same may be varied in many ways. Such variations are not to be regarded as a departure from the spirit and scope of the invention, and all such modifications are intended to be included within the scope of the following claims.

We claim:

1. An emergency call back method, comprising:
    assigning a different emergency routing number to a switch in a wireless network for use as a calling party number of emergency wireless calls routed to a Public Service Answering Point (PSAP) by the switch;
    sending the assigned emergency routing number as the calling party number to the PSAP from the switch;
    receiving the assigned emergency routing number as a called party number at the switch from the PSAP if the emergency call drops such that the switch recognizes the call as an emergency call based on the emergency routing number;
    receiving a mobile station identifier at the switch when the switch receives the assigned emergency routing number as the called party number; and
    paging a mobile station identified by the mobile station identifier when the called party number matches the assigned emergency routing number.

2. The method of claim 1, wherein each assigned emergency routing number is not portable.

3. The method of claim 1, further comprising:
    signaling the mobile station identifier to the switch when initiating the call back.

4. The method of claim 3, wherein the signaling step sends the mobile station identifier in a generic address parameter.

5. The method of claim 1, wherein the mobile station identifier is received at the switch in a generic address parameter.

6. The method of claim 1, wherein the mobile station identifier is a ten digit number.

7. The method of claim 1, wherein the mobile station identifier is a fifteen digit International Mobile Subscriber Identifier.

8. The method of claim 1, wherein the paging step is performed with priority over other tasks at the switch.

9. The method of claim 1, wherein the switch is a mobile switching center.

* * * * *